United States Patent [19]

Humphries

[11] Patent Number: 4,731,123

[45] Date of Patent: Mar. 15, 1988

[54] PROCESS FOR PRODUCING AN INORGANIC FOAM

[75] Inventor: John R. Humphries, Hayes, England

[73] Assignee: EMI Limited, Hayes, England

[21] Appl. No.: 792,405

[22] Filed: Oct. 29, 1985

[30] Foreign Application Priority Data

Nov. 3, 1984 [GB] United Kingdom ............... 8427851

[51] Int. Cl.$^4$ ..................... C09D 1/00; C04B 35/02
[52] U.S. Cl. ........................... 106/286.5; 106/286.6; 106/122; 501/111
[58] Field of Search ................ 106/122, 75, 84, 86, 106/87, 286.5, 286.6; 501/109, 111

[56] References Cited

U.S. PATENT DOCUMENTS

| | | | |
|---|---|---|---|
| 3,208,906 | 9/1965 | Beekman | 424/155 |
| 3,625,723 | 12/1971 | Sicka et al. | 106/86 |
| 3,850,650 | 11/1974 | Von Bonin et al. | 106/75 |
| 4,207,113 | 6/1980 | Yoshino et al. | 252/62 |
| 4,347,325 | 8/1982 | Michel et al. | 106/86 |
| 4,425,167 | 1/1984 | Bryhn | 106/900 |
| 4,432,799 | 2/1984 | Salazar | 106/85 |
| 4,503,109 | 3/1985 | Shubow | 501/111 |
| 4,504,555 | 9/1982 | Prior et al. | 501/111 |
| 4,604,318 | 8/1986 | Prior et al. | 501/111 |

*Primary Examiner*—Theodore Morris
*Attorney, Agent, or Firm*—Fleit, Jacobson, Cohn & Price

[57] ABSTRACT

A process for producing an inorganic foam includes mixing a metallic compound, such as aluminum and/or magnesium nitrate, into a slurry with an acid or acidic solution, such as acid phosphate solution, and then heating the slurry to a predetermined temperature for a sufficient length of time to decompose the metallic compound to the metallic oxide. After the decomposition, reaction can occur between the metallic oxide and the acid or acidic solution to produce a strong binding medium for the foam. As formation, and consequently hardening, of the binding medium cannot commence until after the heating stage, hardening of the binding medium can be controlled to prevent premature hardening before the binding medium is applied to its working environment.

2 Claims, No Drawings

PROCESS FOR PRODUCING AN INORGANIC FOAM

This invention relates to a process for producing an inorganic foam and in particular, though not exclusively, to a lightweight foam suitable for thermal insulation purposes.

It is well known that a strong binding medium for such foams can be produced by a reaction of suitable metallic oxides with acids or acid phosphates. Magnesium and aluminum oxides are commonly used for this purpose, and a suitable acid or acid phosphate for reaction therewith may be phosphoric acid and/or an acid phosphate solution, such as aluminum ortho phosphate (AOP), for example.

However, once the reactive substances have been mixed together, the hardening process of the binding medium for the foam commences, so that the available processing time for producing the foam and applying it to its working environment, whilst it is still sufficiently malleable, is generally constrained by a set length of time, which is generally out of the control of the processor. Under such conditions, premature hardening of the binding medium tends to occur.

It is therefore an object of the present invention to alleviate the above-mentioned problem of premature hardening of the binding medium for the foam.

According to the present invention there is provided a process for producing an inorganic foam comprising the steps of:

mixing a metallic compound, capable of decomposition by heating to a metallic oxide, with an acid or acidic solution, capable of reacting with said metallic oxide, and heating said mixture to a pre-determined temperature to cause said decomposition of said metallic compound to said metallic oxide, thereby enabling a reaction to occur between said metallic oxide and said acid or acidic solution to produce a binding medium for said foam.

The metallic compound is preferably a metallic nitrate, such as aluminum or magnesium nitrate.

An inert, lightweight aggregate, such as Perlite or Vermiculite, and/or a suitable filler, such as clays, zeolites or titania may be mixed with the metallic compound prior to its mixing with the acid or acidic solution.

Reactive metallic oxides may also be added to the metallic nitrate, prior to mixing with the acid or acidic solution, in a quantity sufficient to promote early formation of the binding medium without premature hardening.

The present invention thus enables the hardening time of the binding medium to be controlled, as a reaction to commence the hardening process does not occur until the temperature of the mixture has been raised sufficiently to cause decomposition of the metallic compound to the metallic oxide.

In order that the invention may be clearly understood and readily carried into effect, it will now be further described by way of example only.

A process of producing an inorganic foam may consist initially of mixing a metallic nitrate, preferably aluminum and/or magnesium nitrate, with an inert lightweight aggregate, such as Perlite or Vermiculite, and/or a suitable filler, such as clays, zeolites or titania. The dry mixture is then made into a slurry with an acid or acidic solution, such as an acid phosphate solution. The slurry is then heated to a pre-determined temperature, for a sufficient length of time, to decompose completely the metallic nitrate to the metallic oxide.

For the preferred examples, decomposition of aluminum nitrate to aluminum oxide and gaseous products consisting of oxides of nitrogen occurs at a temperature of approximately 150° C. Magnesium nitrate similarly decomposes to magnesium oxide and oxides of nitrogen at a temperature of approximately 330° C.

After decomposition of the metallic nitrate, reaction can occur between the metallic oxide formed by the decomposition and the acid or acidic solution to produce a strong binding medium for the foam.

However, the present process is advantageous in that a reaction does not commence until the decomposition of the metallic nitrate has occurred, as a consequence of the heating stage, so that the hardening process of the binding medium can be controlled to prevent premature hardening of the binding medium for the foam before it is applied to its working environment, for example as thermal insulation.

A reactive metallic oxide may be added to the metallic nitrate at the initial stage of the process, in a quantity sufficient to promote early formation of the binding medium but insufficient to cause premature hardening of the binding medium.

The addition of the lightweight aggregate and/or suitable fillers is not essential to the present invention and may therefore be omitted.

The amount of acid or acid phosphate solution which is used may be determined so that reaction with the metallic oxide, produced by the decomposition of the metallic nitrate and any additional reactive metallic oxide, results in optimum timing of the hardening process of the binding medium.

Other metallic compounds, which are capable of decomposition to the metallic oxide by heating, may be used as an alternative to a metallic nitrate in the process. Such metallic compounds may consist of a metallic carbonate or hydroxide, for example, which both decompose to produce the metallic oxide and gaseous products when heated.

Phosphoric acid or an acid phosphate, such as aluminum ortho phosphate (AOP), may be used to react with the metallic oxide, after decomposition has taken place, to produce the binding medium for the foam.

In one specific preferred example fillers and/or aggregates are present in a proportion of 10–30% by weight and the remainder is a mixture of aluminum and magesium nitrate in a ration, which, after decomposition, produces a 1:1 ratio of magesium and aluminum oxides. The mixture of magnesium and aluminum nitrate and fillers and/or aggregates is made into a slurry, before heating, with an aluminium ortho phosphate solution having a 48% concentration by weight.

It has been found advantageous to use a mixture of aluminum and magnesium nitrate, which produces the required mixture of aluminum and magnesium oxides on decomposition, because, when heated, a stronger ceramic matrix than that produced by using only one of their aluminum or magnesium nitrate is formed.

The present process is also advantageous in that the unreactive residue slurry is suitable for pouring or pumping during implementation of the process without the danger of blockage in the equipment, which may be caused by premature hardening of the binding medium.

Furthermore, the processing equipment used can be easily cleaned after processing because there is no premature hardening of the binding medium remaining therewithin.

Also, with the present invention, there is little or no change in the volume of material to be handled from the slurry stage to the foam production stage of the process, which may ease implementation of the process.

Heating of the mixture, which is required to commence the reaction to produce the foam, may be used to evaporate undesirable water content therefrom However, the heating process should be carried out relatively slowly to avoid boiling of the water content.

The gaseous products, such as oxides of nitrogen, which evolve during the decomposition stage, may be toxic and/or corrosive, so that a suitable extracting arrangement therefor may be necessary.

Foam produced by the present process has been found to possess bulk densities as low as 350 kg/m$^3$ and cross breaking strengths of approximately 10N.

The present invention therefore provides a process for producing an inorganic foam in a controlled manner which prevents premature hardening of the binding medium for the foam.

What is claimed is:

1. A process for producing a binding medium for an inorganic foam comprising the steps of:
   mixing a metallic nitrate, capable of decomposition by heating to a metallic oxide, with an acid or acidic solution, capable of reacting with said metallic oxide, and
   heating said mixture to a pre-determined temperature to cause said decomposition of said metallic nitrate to said metallic oxide, thereby enabling a reaction to occur between said metallic oxide and said acid or acidic solution to produce a binding medium for said foam.

2. A process for producing a binding medium for an inorganic foam comprising the steps of:
   mixing metallic nitrate, capable of decomposition by heating to a metallic oxide, with an acid or acidic solution, capable of reacting with said metallic oxide, said metallic nitrate consisting of at least one of aluminum nitrate and magnesium nitrate, and
   heating said mixture to a pre-determined temperature to cause said decomposition of said metallic nitrate to said metallic oxide, thereby enabling a reaction to occur between said metallic oxide and said acid or acidic solution to produce a binding medium for said foam.

* * * * *